United States Patent
Frantz

(10) Patent No.: US 8,643,769 B2
(45) Date of Patent: Feb. 4, 2014

(54) METHOD FOR CAPTURING WIDE DYNAMIC RANGE IMAGE IN A 16 BIT FLOATING POINT FORMAT

(75) Inventor: Gene Alan Frantz, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 293 days.

(21) Appl. No.: 13/270,881

(22) Filed: Oct. 11, 2011

(65) Prior Publication Data

US 2012/0262597 A1 Oct. 18, 2012

Related U.S. Application Data

(60) Provisional application No. 61/392,225, filed on Oct. 12, 2010, provisional application No. 61/392,240, filed on Oct. 12, 2010.

(51) Int. Cl.
*H04N 5/235* (2006.01)
*H04N 5/228* (2006.01)

(52) U.S. Cl.
USPC ................ 348/362; 348/222.1; 348/221.1

(58) Field of Classification Search
USPC .............. 348/221.1, 222.1, 362, 363
See application file for complete search history.

(56) References Cited

U.S. PATENT DOCUMENTS

| | | | |
|---|---|---|---|
| 4,393,369 A | 7/1983 | Davies | |
| 6,204,881 B1* | 3/2001 | Ikeda et al. | 348/362 |
| 6,894,721 B1* | 5/2005 | Okada et al. | 348/229.1 |
| 6,927,796 B2 | 8/2005 | Liu et al. | |
| 7,230,644 B2* | 6/2007 | Nakamura et al. | 348/254 |
| 7,308,317 B1 | 12/2007 | Okandan et al. | |
| 7,326,903 B2 | 2/2008 | Ackland | |
| 7,474,345 B2 | 1/2009 | Luo et al. | |
| 2008/0086206 A1 | 4/2008 | Naslatka et al. | |
| 2009/0160987 A1* | 6/2009 | Bechtel et al. | 348/302 |
| 2010/0026838 A1 | 2/2010 | Belenky et al. | |

* cited by examiner

*Primary Examiner* — Tuan Ho
*Assistant Examiner* — Selam Gebriel
(74) *Attorney, Agent, or Firm* — Alan A. R. Cooper; W. James Brady, III; Frederick J. Telecky, Jr.

(57) ABSTRACT

Embodiments of the invention provide a 16 bit floating point signal processor will typically give an order of magnitude more performance than a 32 bit floating point signal processor and about twice as much performance as a 16 bit fixed point processor. Capturing wide dynamic range images in 16 bit floating point format entails representing an iris of a imaging device as an exponent of a floating point number and representing the precision of said imaging device as a mantissa of said floating point number.

13 Claims, 4 Drawing Sheets

METHOD FOR CAPTURING WIDE DYNAMIC RANGE IMAGE IN A 16 BIT FLOATING POINT FORMAT

CROSS-REFERENCE TO RELATED APPLICATION

This application claims the benefit of the filing date of U.S. Provisional Application Nos. 61/392,225, which is titled "METHOD FOR CAPTURING WIDE DYNAMIC RANGE IMAGE IN A 16 BIT FLOATING POINT FORMAT" and was filed Oct. 12, 2010; and 61/392,240, which is titled "MIXED SIGNAL 16 BIT FLOATING POINT PROCESSOR" and was filed Oct. 12, 2010, the disclosure of which is hereby incorporated by reference herein in its entirety.

BACKGROUND

Embodiments of the invention are directed, in general, to imaging systems and, more specifically, to mixed signal 16 bit floating point processors and methods of capturing wide dynamic range images.

An image system converts an optical image focused on an image sensor into electrical signals. Imaging systems have already been employed in a variety of applications, such as medical devices and satellites, as well as microscope and telescope instrumentation. More recently, imaging systems have been utilized in a variety of additional applications such as digital cameras, computer scanners, digital cellular telephones, and digital camcorders. A majority of these applications have utilized charge-coupled-devices (CCDs) as the underlying image sensors. However, CCD-based image sensors are limited or impractical for use in many consumer applications.

For example, CCDs typically are manufactured using four to six inch wafer fabrication lines, whereas many current fabrication processes employ twelve to fourteen inch lines. CCDs thus cannot be fabricated employing conventional Complimentary-Symmetry Metal-Oxide Semiconductor (CMOS) fabrication processes. The mismatch in processing technology for CCDs also precludes the integration of additional on-chip functionality beyond light sensing and charge to voltage conversion for CCDs. As a result, CCDs usually employ independent support chips to perform, for example, CCD control, ND conversion, and signal processing, such as implemented with CMOS integrated circuits (ICs).

The operation of CCD image sensors also requires multiple high supply voltages (e.g., 5 V to 12 V) resulting in higher power consumption than CMOS imagers. As a result, the costs for the CCD image sensor and the system employing the sensor remain high. Additionally, since the current to charge the CCDs is high, CCDs are not well suited for portable devices.

CMOS image sensors have offered several improvements in functionality, power and cost in many applications (e.g., digital video, digital cameras, and digital cell phones). A CMOS type image sensor includes a photodiode or phototransistor employed as a light detecting element. These sensors often use active pixels, and hence their alternate name Active Pixel Sensors (APS). In APS image sensors and image sensor arrays, each pixel contains an amplifier that converts the collected charge packet to a voltage. The output of the light detecting element is an analog signal whose magnitude is approximately proportional to the amount of light received by the elements. The magnitude of the analog signal can be measured for each photodiode representing a pixel, and then stored to provide an entire stored image. CMOS image sensors utilize less power, have lower fabrications costs, and offer high system integration as compared with image sensors fabricated with CCD processes. Additionally, CMOS image sensors have the advantage that they can be manufactured using similar processes employed to those commonly used to manufacture logic transistors, such that the necessary CMOS image sensor support functions can be fabricated on the same chip.

The potential to achieve wide dynamic range imaging with CMOS image sensors has also attracted attention in the field of electronic imaging, attention that was previously focused on CCDs. Dynamic range is the ratio between the brightest and darkest recordable parts of an image or scene. Several techniques have been utilized in an effort to improve the dynamic range of conventional CMOS image sensors that implement voltage domain sampling. Some of these methods include logarithmic response CMOS image sensors, multiple frame capture techniques, and floating-point pixel-level ADC image sensors. Logarithmic response CMOS image sensors incorporate logarithmic compression at the photodiode level to achieve wide dynamic range. The logarithmic response technique suffers from the problem of fixed pattern noise due to device-to-device mismatches, as well as poor sensitivity and local contrast. Multiple frame capture techniques include the implementation of a lateral overflow gate to increase pixel dynamic range. This technique suffers from mismatch in the lateral overflow transistor gate-drain overlap capacitances. It also requires the capturing and storage of multiple frames in conjunction with complex image reconstruction and processing. Furthermore, its logarithmic compression curve strongly reduces image contrast. Floating-point pixel-level ADC image sensors require large memory to store the data, and also require a complex image reconstruction process.

Along with integration and low power hardware, image processing is continually demanding higher performance of the post-image-acquisition hardware to better process images. As image sensors become more capable with wider dynamic ranges that better match the capabilities of the human eye, most of the available performance of signal processing systems will be required to transform the image into a useable form. With the addition of 3D image sensors, the performance demand is even more significantly increased.

As robotic devices and systems continue to expand in their areas of application, often the system-level performance requirement is to see even better than a human can. To do this, better solutions need to be found to process the images in real time at significantly lower power dissipation. Other areas beyond robotics will have the same demand on the signal and image processing system.

Miniature cameras have also been developed for a wide range of applications, including surveillance, automated inspection, inspection in harsh environments, and certain biomedical applications. For example, an intraocular camera for retinal prostheses is being develop to restore sight to the blind. United States Patent Application 200810086206A1 discloses such an Intraocular Camera for Retinal Prostheses, and is herein incorporated by reference. In all of these applications, the minimization of signal and image processing complexity, along with its associated power dissipation, is of critical importance.

The eye is very different from the present systems used to capture pictures and images. One of the distinct differences is in the dynamic range and the representational precision of the two systems. Typical electrical image capturing systems (i.e., image sensors) have 8 to 10 bits of dynamic range with a similar level of representational precision at a given level of exposure. A mechanical iris is often depended on to handle the bulk of the dynamic range of the real world.

On the other hand, the eye has a dynamic range of about eight orders of magnitude (24 to 26 bits) and a representational precision of about 6 to 8 bits. The real world spans an even greater dynamic range than the eye is capable of, perhaps two to three orders of magnitude (6 to 10 bits) greater. One might suggest that the real world has significantly more information available than our electrical capture systems have the capability of detecting.

Therefore, a need exists for a signal and image processor to capture and store this wide dynamic range (WDR) signal in a standard format, as well as to perform the associated signal and image processing operations efficiently.

BRIEF DESCRIPTION OF THE DRAWINGS

Figure 1:
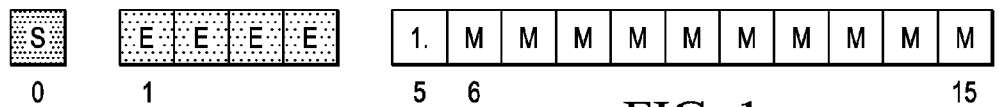

Having thus described the invention in general terms, reference will now be made to the accompanying drawings, which are not necessarily drawn to scale, and wherein:

FIG. 1 shows a 16 bit IEEE standard floating point format.

Figure 2:
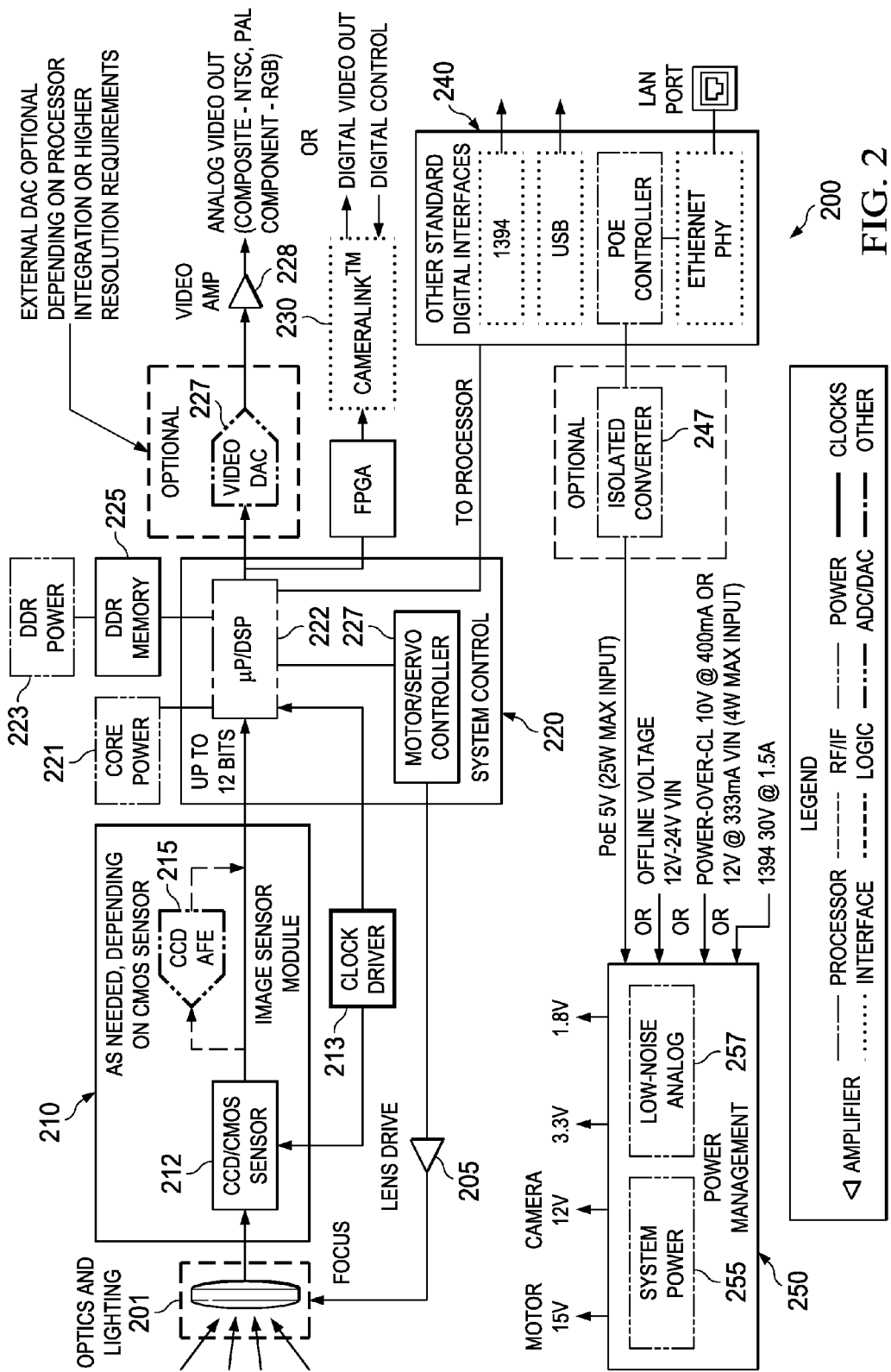

FIG. 2 is a diagram illustrative of a system in accordance with an embodiment of the invention.

Figure 3:
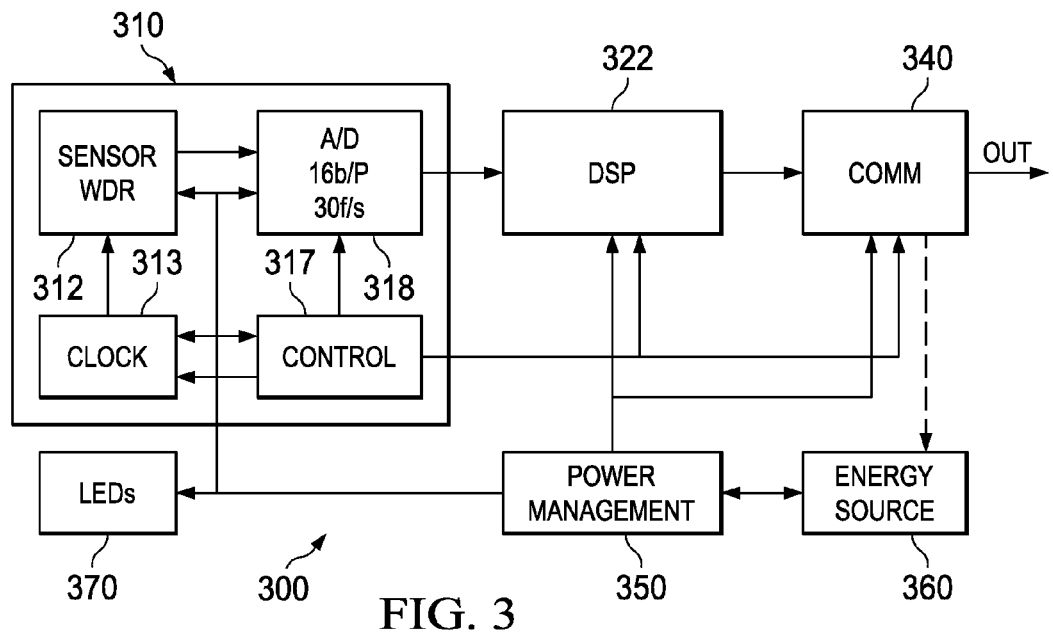

FIG. 3 is a diagram illustrative of an imaging device in accordance with another embodiment of the invention.

Figure 4:
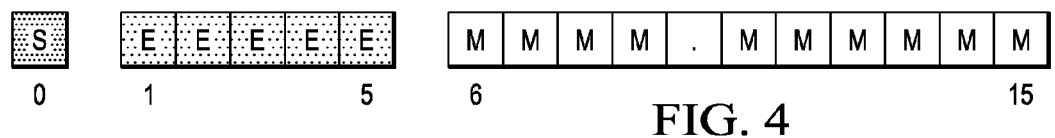

FIG. 4 shows a 16 bit floating point format in accordance with an embodiment of the invention.

Figure 5:
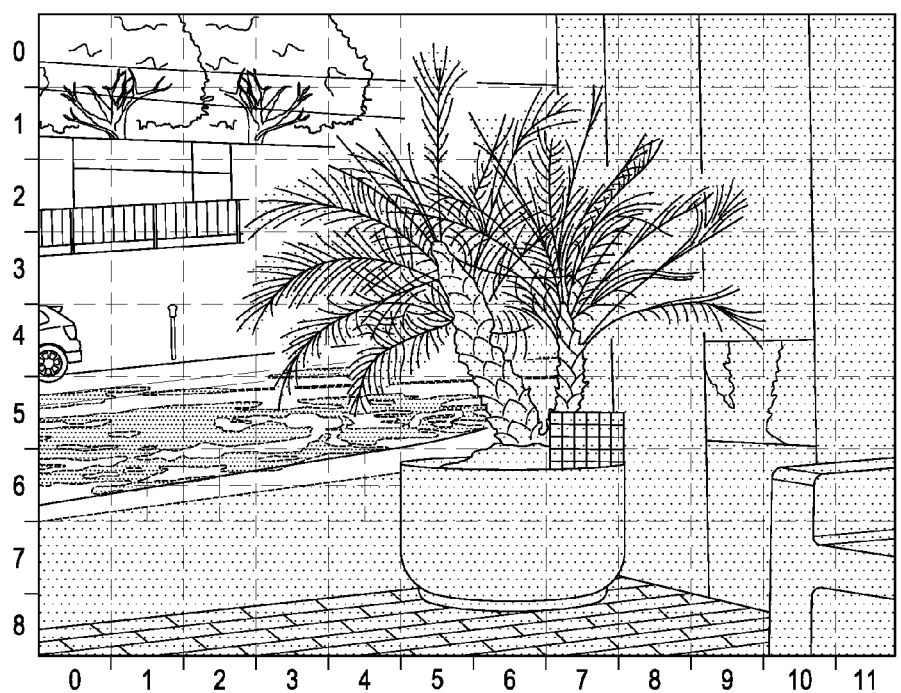

FIG. 5 is a black and white representation of a photograph taken from a covered walkway.

Figure 6:
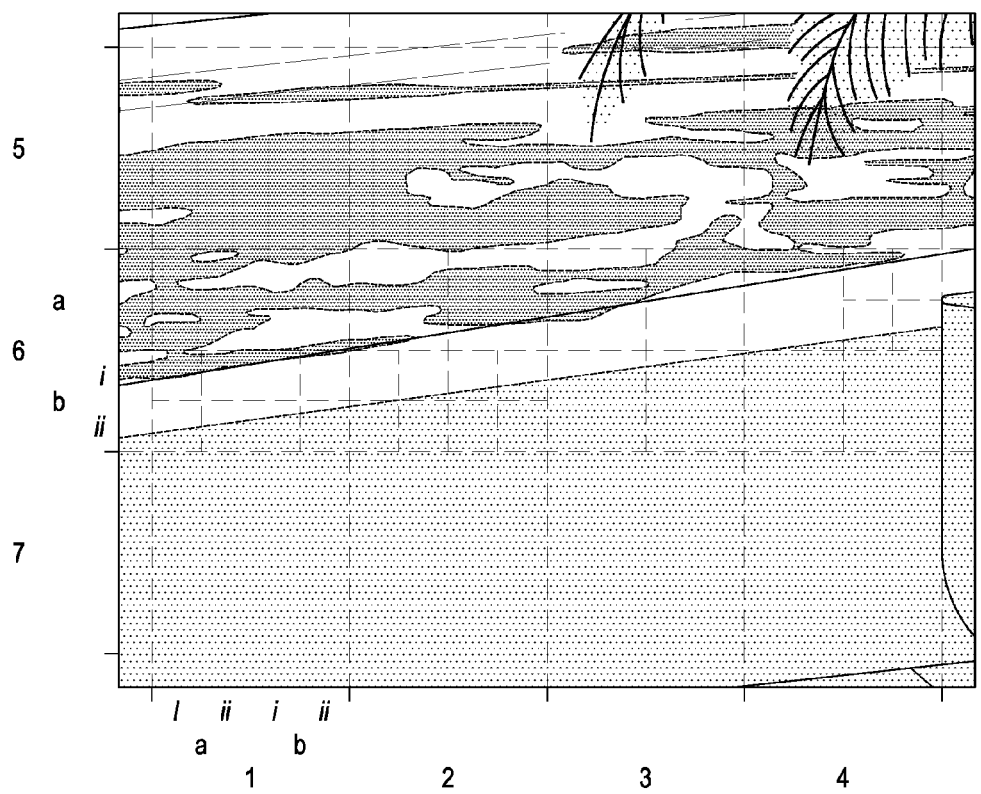

FIG. 6 is a black and white representation of a section of the photograph of FIG. 5.

Figure 7:
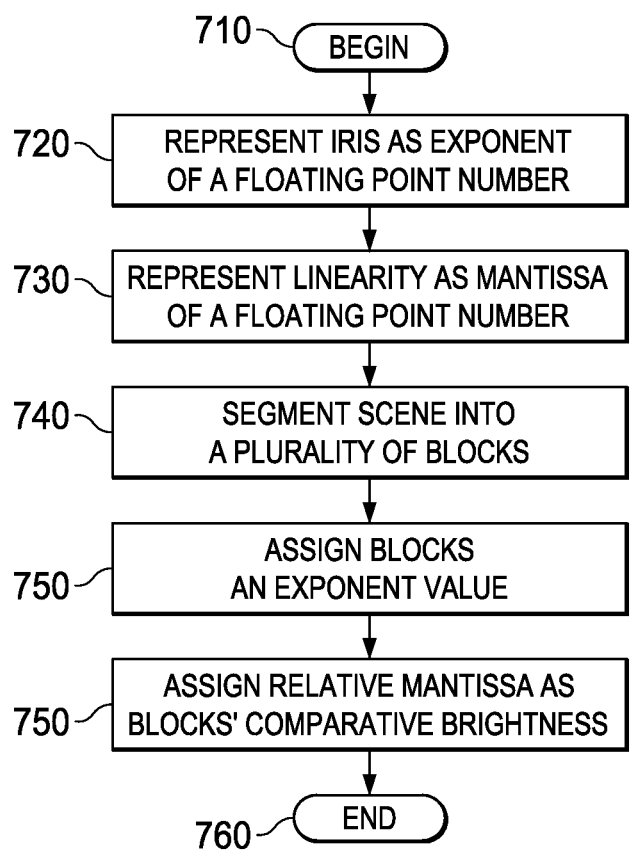

FIG. 7 is a flowchart illustrative of a method for capturing the image values of a scene, photograph, or pictures in accordance with an embodiment of the invention.

DETAILED DESCRIPTION

The invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Presently, imaging processing is often implemented using a floating point signal processor (typically 32 bits) or a fixed point signal processor (typically 16 bits). Because the data requirements of a real world (wide dynamic range) image signal fit neither of these processing systems, and because of the high demand for more performance, we propose using a 16 bit floating point format. The Institute of Electrical and Electronics Engineers (IEEE) Standard for Floating-Point Arithmetic (IEEE 754) is an established and used technical standard for floating-point computation.

For information purposes, an explanation of the basic features of the 16 bit IEEE standard floating point format is provided below. Referring now to FIG. 1, the structure of the 16 bit IEEE standard floating point format includes a sign bit (S), an exponent (referred to as E, consisting of five binary digits as shown in FIG. 1 and a decimal equivalent), and a mantissa (referred to as M, also consisting of ten binary digits as shown in FIG. 1 and a decimal equivalent):

Sign bit (S): "1" is ""
Exponent (E): E'15 is the value used in computation
Mantissa (M): Bit 6 is the most significant bit (MSB) and Bit 15 is the least significant bit (LSB)

The value V represented by a given data word may be determined as follows:

If E=31 and M is nonzero, then V=NaN ("Not a number")
If E=31 and M is zero and S is 1, then V=−Infinity
If E=31 and M is zero and S is 0, then V =Infinity
If 0<E<31 then V=(−1)**S*[2**(E−15)]*(1.M . . . ), in which "1.M" is intended to represent the binary number created by prefixing M with an implicit leading 1 and a binary point, as in the sixth digit in FIG. 1, and in which "1.M . . . " is intended to represent the binary number created by prefixing the full mantissa with an implicit leading 1 and a binary point.
If E=0 and M is nonzero, then V=(−1)**5*[2**(−14)]*(0.M) These are "unnormalized" values.
If E=0 and M is zero and S is 1, then V=−0
If E=0 and M is zero and S is 0, then V=0

A 16 bit floating point signal processor will typically give an order of magnitude more performance (for example, in terms of the number of floating point operations per unit time per unit power) than a 32 bit floating point signal processor and about twice as much performance as a 16 bit fixed point processor.

But, this still does not match the ultimate image processing system, the human eye plus the human brain. The first obvious difference is that the exponent of a floating point number may represent the function of the iris in a human eye, which may be implemented either at the global or local level. That is, it may change so that the whole image or "picture" is normalized at the global level, or that a region of the image is normalized at the local level. In the analog world, this would be called the Automatic Gain Control (AGC), except that herein it is also envisioned to be implemented at either the global or local level as well. Its purpose is to make sure the information found in the shadows has the same contrast ratio as the information found in the bright sunlight.

Finally, due to the noise tolerance of the image system, embodiments of the image processing system would handle the exponent in the analog domain as an AGC and handle the mantissa in the digital domain. Once the normalized image is resident in the signal processor, the mantissa may be further reduced to match the representational precision of the human eye (about 6 to 8 bits) to further reduce the data size. Such a reduction would significantly increase the performance while reducing the cost and power dissipation of the system. The term linearity may also be used instead of representational precision.

The base assumption used in this processor is that the optimal image processing system is the human eye in combination with the human brain. The eye has about 150 dB (24 to 26 bits) of dynamic range and about 40 dB (6 to 8 bits) of representational precision. The brain seems to have a significant amount of tolerance to noise and nonlinearity. In addition, much of the information needed in image processing systems is in the high frequency information (edges). Finally, although performance is high in importance, both cost and power dissipation are gaining in equal importance.

All of this drives toward the embodiments of the invention that provide for a mixed signal image processing system and methods for using same. The embodiments process the exponent in the analog domain and the mantissa in the digital domain. This combination could give as much as 8 to 10 more orders of magnitude of performance to the processor with minimal added cost or power dissipation.

An image signal processor in accordance with embodiments of the invention provides movement to a 16 bit IEEE floating point processor; manages the exponent in the analog domain; reduce the mantissa to 6 to 8 bits; and manages the mantissa in the digital domain. The raw performance of the signal processor is increased by a significant amount (orders of magnitude). At the same time, the cost and power dissipation are reduced. Finally, the image signal can be captured as the eye sees it, and processed in a similar fashion to how the human brain would do it.

FIG. 2 shows a typical imaging device 200. An image may enter an optics module 201 which has mechanical or electrically driven lens. The electrically driven lens is driven by lens drive 205. The adjusted image enters a sensor 212 of an image sensor module 210. An analog front end (AFE) 215 is needed for a CCD sensor if the sensor is a CCD. System control 220 includes a processor 222 and motor servo controller 227. Processor 222 provides intelligence to the system. Power for processing cores is provided by core power module 221. The processor also provides commands to lens driver 105 using a controller 227. Memory 225 may also be coupled to the processor 222. The memory may have a separate power control 223 than that of the processor. Analog output may be provided through a video digital/analog converter (DAC) 227 and amplifier 228. Coupled to the processor 222 are various standard interfaces 240. Such interfaces include but are not limited to 1394 Firewire™ USB, Ethernet, and the like. Power management may be provided by a power management module 250 which may include system power management 255 and low-noise analog 257 components, or others coupled to various sources of power. Power over Ethernet (POE) may also be provided through converter 247.

Cameralink™ interface 230 may provide a serial communication protocol interface for computer vision and other similar applications. Cameralink™ interface 230 is based on the the Channel-link™ interface formerly of National Semiconductor, now of the Texas Instruments Incorporated Silicon Valley Analog (SVA) business (Santa Clara, Calif.).

FIG. 3 is a diagram illustrative of a system in accordance with an embodiment of the invention. In 300, an imaging module 310 may include a wide dynamic range (WDR) sensor 312 and an analog/digital converter A/D 318. Control is provided by controller 317. An examplar micro-controller may be the MSP430 by Texas Instruments Incorporated (Dallas, Tex.). A clock 315 provides clocking signals to sensor 312 and controller 317.

The A/D 318 outputs digital signals to a digital signal processor DSP 322. The DSP 322 receives control signals from controller 317 and power from power management 350, which manages power from energy source 360. Various DSPs are known in the art. An exemplar is the C55x from Texas Instruments Incorporated (Dallas, Tex.). Power management also provides power to components of 310. A communications interface is shown in 340. A light source such as LEDs 370 may be provided and receives power through power management 350.

Imaging module 310 captures a WDR signal in a floating point format. The exponent of the floating point number best represents the iris of the eye, while the mantissa best represents the representational precision of the eye. Combined, the floating point number captures the real world visual signal in analogy to the way the human eye does.

The next task is to assign quantities of bits to each exponent and mantissa. It appears that the best fit is a 16 bit floating point number in which one bit is assigned to the sign of the number, five bits are assigned to the exponent and 10 bits are assigned to the mantissa (an implied "1" is inserted before the MSB of the mantissa). Embodiments of the invention provide the ability to capture an image signal of up to 41 bits of dynamic range with a ten bit representational precision. This format easily covers the capability of the eye, while also allowing significant head room for "better than the eye" signals.

Further, in some cases the 16 bit floating point format may not be IEEE standard, but rather a format that better captures what the eye does with a scene. The handling of the mantissa may vary from that of the IEEE format mantissa. The IEEE format inserts an implied 1 before the MSB of the mantissa. Also it is assumed that the binary point is between the implied 1 and the MSB of the mantissa. Finally, bit "0" of the 16 bit word is the sign bit for the mantissa. Since light is always a positive number, the sign bit can either be ignored in representing the light intensity, used for other signaling purposes, or included in the mantissa thereby giving a real 11 bits. And, since the iris of the eye seems to act (at the global level) more like a block floating point system than an IEEE floating point system, the way both the exponent and mantissa are constructed may need to be altered from how they are handled in IEEE format.

FIG. 4 shows a 16 bit floating point format in accordance with another embodiment of the invention.

Sign bit (S): "1" is "−"
Exponent (E): E−15 is the value used in computation
Mantissa (M): Bit 6 is the MSB and Bit 15 is the LSB
Binary point: Placed between Bits 9 and 10

The value V represented by a given data word may be determined as follows:

If E=31 and M is nonzero, then V=NaN ("Not a number")
If E=31 and M is zero and S is 1, then V=−Infinity
If E=31 and M is zero and S is 0, then V=Infinity
If 0<E<31 then V=(−1)**S*[2**(E−15)]*(M.M)
If E=0 and M is nonzero, then V=(−1)**5*[2**(−14)]*(0.M) These are "unnormalized" values.
If E=0 and M is zero and S is 1, then V=−0
If E=0 and M is zero and S is 0, then V=0

Put in simple terms, the signal and image processor segments a scene into blocks of pixels, in which each block would have one exponent value for all of the pixels in the block. The blocks may be of any size "m×n" where both "m" and "n" are equal to or greater than 1. An example could be 16×16 pixels.

Each block is assigned an exponent value depending on the mean brightness of that block. Then each pixel is assigned a relative mantissa value that represents its brightness compared to the mean brightness. For example, if one were to take a picture of a person standing in front of a window, the blocks would be such that the person's body would be represented by a set of blocks with the same exponent value (or similar), and the window would be represented by a set of blocks with another exponent value. In FIG. 5 and FIG. 6, it is evident how the blocks might be created for the picture shown. The very bright areas would have high exponent values, and the dark areas would have low exponent values. In the example, square blocks of pixels are used, but any shape of the blocks would be appropriate—even non-rectangular. The ultimate solution is that the mantissas for all of the pixels in the scene create a normalized picture, and the exponent values indicate the variation of brightness over the whole scene.

If any pixel saturates the mantissa, or if the mantissa becomes zero; the block may be split into a subset of blocks, for example, four equal blocks, and the mean and pixel brightnesses are established for each of the smaller blocks. If, in these smaller blocks, saturation or zero occurs again, the block(s) it occurs in may be split again into a subset of blocks, for example, once again into four equal blocks.

In many cases, the mean exponent value of a particular block may be assumed to be the same as its nearest neighbor(s).

In many cases, the set of block exponents may be neglected and only the mantissa would be manipulated for further processing.

Also in the example a mean brightness for the exponent is used. However, this could be done differently. When choosing the mean as the exponent value, the binary point would be perhaps between the $4^{th}$ or $5^{th}$ bit in the mantissa. But one could choose the brightest pixel as the exponent value and then the binary point would be in front of the MSB of the mantissa, or after the MSB depending on the accuracy of picking the brightest pixel in the block.

FIG. 5 and FIG. 6 show an example of the process for determining how to create smaller blocks from larger ones. Also, one could always assume that the exponent of the present block is the same as the previous block and then test for saturation or zeroing. FIG. 5 is a black and white representation of a photograph taken from a covered walkway using approximately 100,000 lux outdoor illumination. FIG. 6 is a black and white representation of a section of the photograph of FIG. 5. Below is a table showing the blocks (blks)/sub-blocks and values for the mean exponent value.

| BLK# | Emean | Comment |
|---|---|---|
| 51 | 5 | Calculated |
| 52 | 5 | Use Previous |
| 53 | 5 | Use Previous |
| 54 | 5 | Use Previous |
| 61 | 5 | Use Previous |
| 6a1a | 5 | Use Previous |
| 6a1b | 5 | Use Previous |
| 6bi1ai | 8 | Recalculate |
| 6bi1aii | 8 | Use Previous |
| 6bii1ai | 6 | Recalculate |
| 6bii1aii | 5 | Recalculate |
| . | | |
| . | | |
| . | | |
| 71 | 4 | Use Previous |
| 72 | 4 | Use Previous |
| 73 | 4 | Use Previous |
| 74 | 4 | Use Previous |

Another embodiment of the invention involves mixed signal analog to digital (A/D) conversion. In this case, the A/D would be digital for the mantissa, say 8 bits. The exponent would be an AGC whose purpose is to change the sensitivity of the sensor based on the needed "exponent" to capture the picture. Consider a 32 bit per pixel image sensor. The AGC would determine which 8 bits of the 32 (for an 8 bit mantissa) would be captured, or how much more gain would be put on the output of the pixels, or how much sensitivity would be given to the pixels.

The image processing system that processes the data may require the data be in a different format, requiring adjustments to the proposed data format. These adjustments are provided below.

For use in a vision format, the image may be normalized by replacing acquired exponent values for each block with one value of the user's choice. For full dynamic range the mantissa may be shifted for each block such that the MSB (Bit 6) is a "1", adjusting the exponent for that block to keep data integrity.

To move to the IEEE format, the image may be normalized by replacing the acquired exponent values for each block with one value of the user's choice. Then shift the mantissa for each block such that the MSB (Bit 6) is a "1", adjusting the exponent for that block to maintain data integrity.

For full dynamic range, the exponent value assigned to each block is kept. The mantissa is shifted for each pixel such that the MSB (Bit 6) is a "1", then shifted one more time, to adjust the exponent for that pixel to maintain data integrity. Then the value in each pixel is formatted into the IEEE format.

To work in fixed point, the exponent is ignored. Assume that the binary point is placed prior to Bit 6. If necessary, all of the data is shifted such that the MSB of the data set is in Bit 1. Assume that the sign bit is Bit 0.

There is no real standard to the format of an image pixel representation. It could be, for example, 8 bits, 10 bits, or 16 bits. As WDR image sensors become more available, the output of the captured image could be anywhere from the present 8 to 16 bits to 32 or more bits of dynamic range. In the case of the 32 bit output, only 8 to 10 of those bits are significant (and probably only 6 to 8 bits). If formatted in a 16 bit floating point format, the 32 bit representation could easily be captured.

The output of an image sensor could always be placed in a standard 16 bit format. In many cases for which the image signal processor need only process the normalized image, the full 16 bits could be accepted but then the sign and exponent bits would be neglected, working only with the mantissa.

A method for capturing the image values of a given image or picture in floating point format is shown in FIG. 7. The method 700 begins at 710. The iris of the imaging device is represented as the exponent of a floating point number at 720. The representational precision of the imaging device is represented as a mantissa of the floating point number, 730. A scene is segmented into a plurality of blocks at 740. Each of the plurality of blocks is assigned an exponent value depending on the mean brightness of that block, 750. A relative mantissa value that represents the brightness of the block compared to said mean brightness is completed at 750, with the method ending at 760.

Although several still image, photograph, and video applications are provided as examples, embodiments of the invention may also be used in other applications for which floating point processing is useful, such as in audio signal processing.

Many modifications and other embodiments of the invention to which this invention pertains will come to mind to one skilled in the art, having the benefit of the teachings presented in the foregoing descriptions and the associated drawings. Therefore, it is to be understood that the invention is not to be limited to the specific embodiments disclosed. Although specific terms are employed herein, they are used in a generic and descriptive sense only, and not for purposes of limitation.

What is claimed is:

1. A method of capturing an image in a floating point format, said method comprising:
   representing an iris of a imaging device as an exponent of a floating point number;
   representing a representational precision of said imaging device as a mantissa of said floating point number;
   segmenting a scene into a plurality of blocks;
   assigning each of said plurality of blocks an exponent value depending on a mean brightness of that block; and
   assigning a relative mantissa value that represents its brightness compared to said mean brightness.

2. The method of claim 1, wherein said imaging device is an intraocular camera.

3. The method of claim 1, further comprising normalizing said image by replacing a plurality of acquired exponent values for each block with one value of a user's choice.

4. The method of claim 1, further comprising:
shifting said mantissa for each block such that a MSB is a "1"; and
adjusting the exponent for that block to maintain data integrity.

5. The method of claim 1, further comprising:
normalizing said image by replacing said acquired exponent values for each block with one value of a user's choice;
shifting said mantissa for each pixel such that a MSB is a "1"; and
adjusting the exponent for that pixel to maintain data integrity.

6. The method of claim 1, further comprising:
keeping said exponent value assigned to each block;
shifting said mantissa for each block such that a MSB is a "1"; and
shifting again to adjust the exponent for said block to maintain data integrity.

7. The method of claim 1, further comprising:
ignoring said exponent value assigned to each block;
placing a binary point prior to a bit 6;
shifting data is shifted such that the MSB of the data set is in bit 1"; and
insuring that a sign bit is bit 0.

8. A mixed signal processor coupled to a non-volatile program memory for storing a sequence of operating instructions, said mixed signal processor further comprising:
at least one 16 bit floating point format number defining an image captured by an imaging device comprising:
an exponent for representing an iris of said imaging device;
a mantissa for representing a representational precision of said imaging device;
wherein the instructions in said non-volatile program memory instructs processor to perform the steps of:
segmenting a scene into a plurality of blocks;
assigning each of said plurality of blocks an exponent value depending on a mean brightness of that block; and
assigning a relative mantissa value which represents its brightness compared to said mean brightness.

9. The mixed signal processor of claim 8, wherein the instructions in said non-volatile program memory further instruct processor to perform the step of normalizing said image by replacing a plurality of acquired exponent values for each block with one value of a user's choice.

10. The mixed signal processor of claim 8, wherein the instructions in said non-volatile program memory further instruct processor to perform the steps of:
shifting said mantissa for each block such that a MSB (bit 6) is a "1"; and
adjusting the exponent for that block to maintain data integrity.

11. The mixed signal processor of claim 8, wherein the instructions in said non-volatile program memory further instruct processor to perform the steps of:
normalizing said image by replacing said acquired exponent values for each block with one value of a user's choice;
shifting said mantissa for each pixel such that a MSB (bit 6) is a "1"; and
adjusting the exponent for that pixel to maintain data integrity.

12. The mixed signal processor of claim 8, wherein the instructions in said non-volatile program memory further instruct processor to perform the steps of:
keeping said exponent value assigned to each block;
shifting said mantissa for each block such that a MSB (bit 6) is a "1"; and
shifting again to adjust the exponent for said block to maintain data integrity.

13. The mixed signal processor of claim 8, wherein the instructions in said non-volatile program memory further instruct processor to perform the steps of:
ignoring said exponent value assigned to each block;
placing a binary point prior to a bit 6;
shifting data such that the MSB of the data set is in bit 1"; and
insuring that a sign bit is bit 0.

\* \* \* \* \*